Feb. 15, 1938.   C. T. ROGERS   2,108,270
FLUID OPERATED CHANGE SPEED GEAR
Filed Nov. 24, 1934   2 Sheets-Sheet 1

INVENTOR.
Clarence T. Rogers
BY
ATTORNEY.

Feb. 15, 1938.  C. T. ROGERS  2,108,270
FLUID OPERATED CHANGE SPEED GEAR
Filed Nov. 24, 1934  2 Sheets-Sheet 2

INVENTOR.
Clarence T. Rogers
BY
ATTORNEY.

Patented Feb. 15, 1938

2,108,270

UNITED STATES PATENT OFFICE 2,108,270

FLUID-OPERATED CHANGE-SPEED GEAR

Clarence T. Rogers, New York, N. Y., assignor to Edward T. Condon, New York, N. Y.

Application November 24, 1934, Serial No. 754,581

4 Claims. (Cl. 192—58)

The invention relates to variable speed transmission mechanism, more especially of the fluid-operated type of change-speed gear and whereby any desired speed ratio between a maximum speed and a zero speed of rotation is obtainable.

The invention has for an object the provision of mechanism of this nature designed to adjust itself automatically to the demands of the applied load; also, the provision of means for regulating manually the transmission ratio.

A further object of the invention resides in the provision of a construction of transmission mechanism which shall be simple and effective and flexible in operation and which will admit, moreover, of convenient regulation.

In carrying out the invention, a liquid-sealed housing or driving member encloses a casing which is rotatable therewith but which is eccentrically disposed therein. Within the casing is mounted concentrically with the housing, and for cooperation with said casing, a drum or rotor member carrying a pair of diametrally disposed and radially slidable vanes contacting with the inner surface of the surrounding casing, said vanes continuously maintaining contact with said surface. These vanes form adjoining eccentric suction and pressure working spaces in the casing, and there is provided through said casing an inlet port to the suction space and an outlet port or ports through the casing from the pressure space.

The said rotor constitutes the driven element of the transmission device and its rotation will be governed by a valve adapted to fit the said outlet port of the casing, there being provided to this end means for applying a desired pressure upon the valve and which pressure may be caused to vary as the rotational velocity of the driving members of the mechanism changes. Provision is also made for maintaining the valve substantially free when no rotational motion is being transmitted and when the driving engine is idling and no power is transmitted through the transmission gear.

In addition, manually operable means may be associated with the valve for regulating its action, as for braking purposes.

The nature of the invention, however, will best be understood when described in connection with the accompanying drawings, in which.

Figure 1:
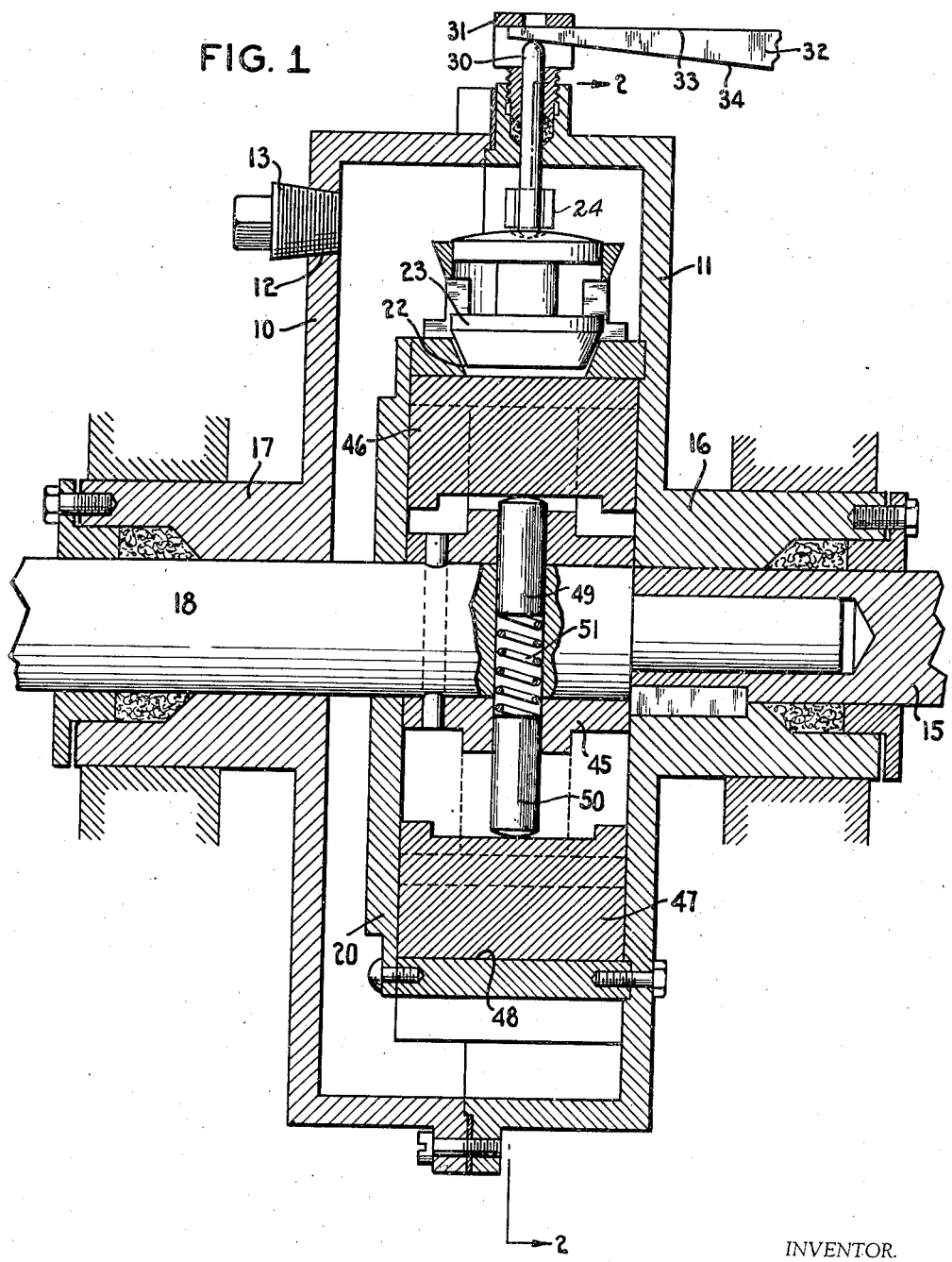
Fig. 1 is a detail longitudinal section through the novel transmission mechanism.

Referring to the drawings, a suitable housing is provided comprising, for example, the separable halves 10 and 11, and one of which may be provided with a filling opening 12 and plug 13 therefor, whereby a liquid such as oil may be introduced into the housing for the purpose hereinafter set forth. The position of this filling opening in the housing may be so chosen as to determine the proper volume of liquid to be introduced and which is such as to fill slightly less than completely the said housing and a contained casing hereinafter more fully set forth. The said housing is designed to be rotated, as by being carried, for example, upon a driving shaft 15 which may be keyed thereto as indicated, said shaft extending into the housing through one side thereof or rather into a trunnion 16 integral with the housing.

Coaxial with this trunnion and extending integrally from the opposite side of the housing is a further trunnion or bearing 17 in which is supported for rotation a driven shaft 18, the same extending into the interior of the housing and into a casing 20 which is located within the said housing and fixed thereto to rotate therewith.

Figure 2:
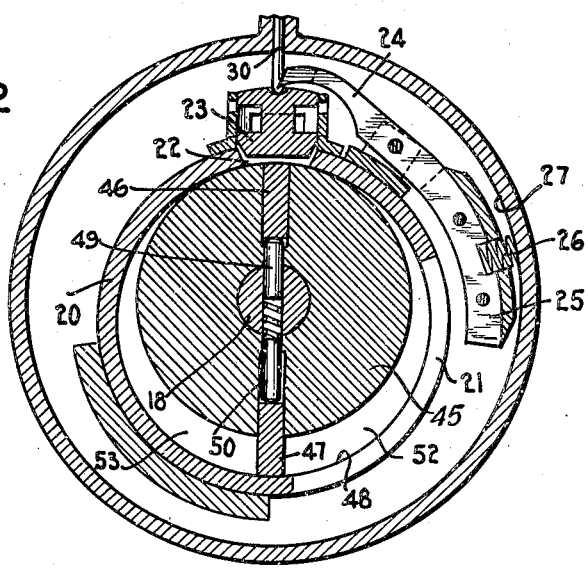
Fig. 2 is a transverse section therethrough, on a reduced scale and taken on the line 2—2, Fig. 1 of the drawings, and looking in the direction of the arrows.
Figure 3:
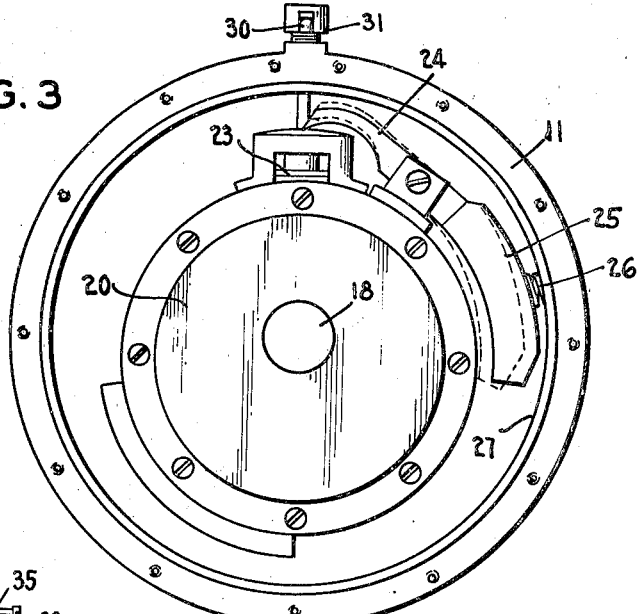
Fig. 3 is an end view of the mechanism with one of the housing halves removed.

The casing 20, however, is not disposed coaxially with reference to the driving and driven shafts 15 and 18 whose axes coincide with the axis of rotation of the housing. There is provided in the wall of casing 20 a liquid admission port 21 and a liquid outlet port 22 circumferentially displaced therefrom; and the latter port is adapted to be closed by a valve 23 supported on the exterior of the casing 20. This valve, when the transmission gear is not transmitting power, is arranged to be substantially free and open; but is adapted for engagement by a lever, pivotally secured to the casing 20 and having its one arm 24 forked and adapted to bear upon the head of said valve 23. Its opposite arm 25, moreover, is weighted to maintain valve 23 normally free, and it may support, also, a compression spring 26 bearing upon said arm 25 and the inner surface 27 of the housing. By this expedient, no pressure is exerted upon the valve 23 to maintain it closed, while the housing is not rotating, as indicated in the dotted line position, Fig. 3; but when the housing and the casing rotate therewith at a substantial velocity, the centrifugal effect upon lever arm 25 will tend to increase the pressure exerted by the arm 24 in opposition to the force exerted by spring 26 thereon, as indicated in the full-line positions, Figs. 2 and 3.

Under certain conditions, it may be desirable to exercise a more positive control or manual regulation over the valve 23 than would be afforded merely by the aforesaid arrangement. To this end, means additional to the said lever may be associated with the valve, or utilized solely, to regulate its position relatively to the outlet port 22.

For example, a pin 30 is reciprocably mounted in one of the housing halves with one end bearing upon the top of valve 23 while its opposite end protrudes beyond the housing beneath an overhanging abutment 31 for a sliding and tapered control member 32. This member engages, for example, with its flat side 33 the said abutment and with its inclined side 34 the top of the pin 30, wedging thus between said pin and abutment. By exerting pressure on the tapered member longitudinally thereof, pin 30 may be shifted accordingly to position the valve with respect to its port.

Figure 4:
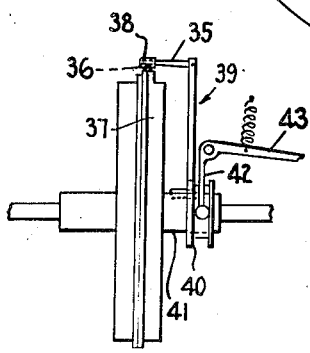
Fig. 4 illustrates, in elevation, the application of manually operable means for regulating a valve controlling the outflow of liquid.

A convenient means for shifting the control member is indicated in Fig. 4, wherein a longitudinally slidable member 35 is shown with its one end working between the outer end of a pin 36, protruding beyond the housing 37, and an abutment element 38 attached to the housing. Member 35 is linked at the opposite end to an arm 39 carried by a slidable collar 40 mounted over the trunnion 41. The collar, in turn, is engaged by a fork 42 of a bell-crank lever 43 which is secured to a fixed support (not shown), it being understood that both the arm and control member 35 rotate with the said housing.

In order to transmit the rotational motion of the housing and casing as to the driven shaft 18, there is fixedly secured to the shaft a cylindrical drum member or rotor 45 located coaxially with said driving and driven shafts and housing, but eccentrically disposed with reference to the casing 20 and being adapted for osculatory contact with its inner surface. In addition, rotor 45 carries a pair of diametrally disposed vanes 46 and 47 which are radially slidable therein to extend respectively beyond the periphery of the rotor member for contact with the inner surface 48 of casing 20 as the latter rotates. Provision is made, as by means of reciprocable pins 49 and 50 extending diametrally into the rotor, to force the respective vanes radially outwardly through the action of a spring 51 compressed between the inner ends of the respective pins.

The said vanes thus divide the interior of casing 20 into adjoining eccentric suction and eccentric pressure working spaces 52 and 53 for the rotor, the former working space 52 being in free communication with the said admission port 21 and the latter working space 53 with the outlet port 22.

It will be understood, therefore, that as casing 20 rotates with the housing and driving shaft, for example in a counter-clockwise direction, the pressure working space 53 will be contracted in volume and the pressure therein will be increased with the liquid being forced toward the outlet opening 22, as in the case of a rotary pump. This will cause to be carried along with the casing the rotor member 45, the driving force being proportional to the pressure tending to close valve 23, the valve opening to relieve the fluid pressure existing within the pressure working space and discharge the driving liquid into the housing when the oil pressure exceeds the pressure exerted on the valve, as hereinbefore set forth. As the one vane eventually passes the port 22, it enters the suction pressure space 52, which is filled with liquid and which is then brought thereby into the pressure working space 53 to repeat the cycle, the other vane in the meantime having passed through the pressure working space to provide the rotative effort.

I claim:

1. A fluid-operated change-speed gear comprising a liquid-sealed housing, a driving shaft for rotating the same, a casing eccentrically mounted within the housing and rotatable therewith, said casing being provided with a permanently open, peripheral, liquid-admission port and with a peripheral, liquid-outlet port circumferentially spaced from the said admission port, a valve for controlling the outflow of liquid through said outlet port, a lever pivotally mounted upon the casing having its one end adapted to bear upon the valve and its opposite end weighted to react centrifugally for closing the valve, a spring mounted in the opposite end of the lever and compressed between said opposite end and the inner face of the housing wall, a rotor mounted concentrically within the casing and a driven shaft rotatable therewith and extending coaxially through one side of the housing, and oppositely directed vanes rotatable with the rotor and slidable radially thereof to contact the inner surface of the surrounding eccentrically disposed casing, there being contained within the housing and casing a suitable liquid.

2. A fluid-operated change-speed gear comprising a liquid-sealed housing, a driving shaft for rotating the same, a casing eccentrically mounted within the housing and rotatable therewith, said casing being provided with a permanently open, peripheral, liquid-admission port and with a peripheral, liquid-outlet port circumferentially spaced from the said admission port, a valve for controlling the outflow of liquid through said outlet port, a lever pivotally mounted upon the casing having its one end adapted to bear upon the valve and its opposite end weighted, a spring mounted in said opposite end of the lever and compressed between said end and the inner face of the housing wall, a rotor mounted concentrically within the casing and a driven shaft rotatable therewith and extending coaxially through one side of the housing, and oppositely directed vanes rotatable with the rotor and slidable radially thereof to contact the inner surface of the surrounding eccentrically disposed casing, there being contained within the housing and casing a suitable liquid.

3. A fluid-operated change-speed gear comprising a liquid-sealed housing having a pair of oppositely extending trunnions, a driving shaft keyed to one of said trunnions and a driven shaft mounted in the other as a bearing and extending centrally into the housing, a casing within the housing and rotatable therewith eccentrically with respect to the driven shaft, said casing being provided with a permanently open, peripheral, liquid-admission port and with a peripheral, liquid-outlet port circumferentially spaced from the said admission port, a valve movable with the casing for controlling the outflow of liquid through its outlet port, a lever pivotally mounted upon the casing having its one end adapted to bear upon the valve and its opposite end weighted to react centrifugally for closing the valve, a spring mounted in the opposite end of the lever and compressed between said opposite end and the inner face of the housing wall, a pin reciprocably mounted in the housing having its one end protruding beyond the same and the other engaging the valve, manually operable means slidable upon the driving shaft trunnion and a control member actuated thereby for engaging the protruding end of said reciprocable valve pin, a rotor mounted within the casing, concentrically with the driven shaft and rotatable therewith, and oppositely directed vanes rotatable with said rotor and movable radially thereof to contact the inner wall of the casing, there being contained within the housing and casing a suitable liquid.

4. A fluid-operated change-speed gear comprising a liquid-sealed housing, a driving shaft for rotating the same, a casing eccentrically mounted within the housing and rotatable therewith, said casing being provided with a permanently open, peripheral, single liquid-admission port and with a single peripheral, liquid-outlet port circumferentially spaced from the said admission port, valve means movable with the casing for controlling the outflow of liquid through its outlet port, means movable with the casing for operating the valve in accordance with the angular velocity of said casing, additional means acting upon said valve for manual operation thereof, a rotor mounted concentrically within the casing and a driven shaft rotatable therewith and extending coaxially through one side of the housing, and oppositely directed vanes rotatable with the rotor and slidable radially thereof to contact the inner surface of the surrounding eccentrically disposed casing, there being contained within the housing and casing a suitable liquid.

CLARENCE T. ROGERS.